Nov. 8, 1927.
J. E. HERMAN
1,648,230
ANTIGLARE ATTACHMENT FOR MOTOR VEHICLES
Filed May 14 1926    2 Sheets-Sheet 1
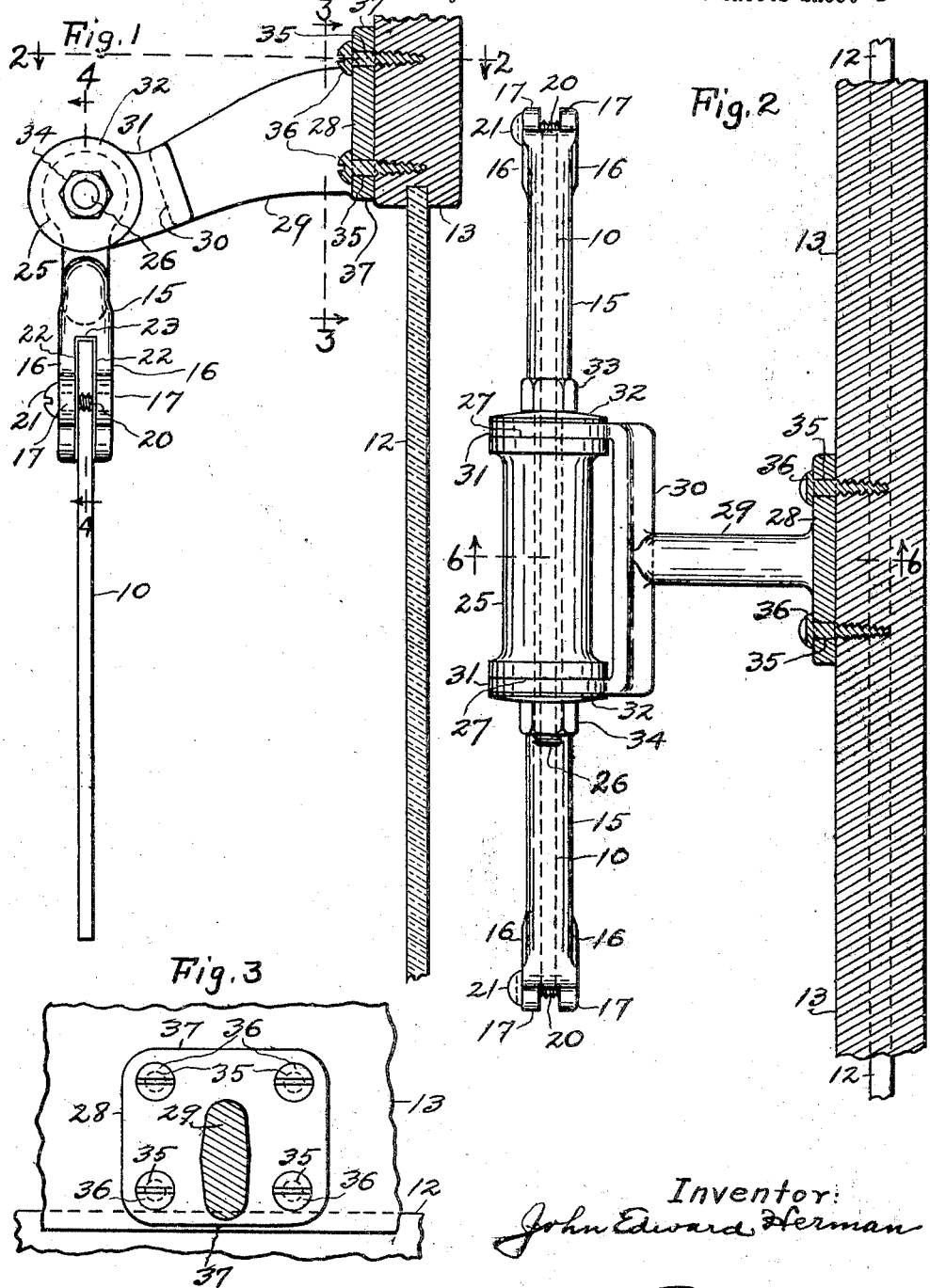
Inventor:
John Edward Herman
By his Attorney.

Nov. 8, 1927.  
J. E. HERMAN  
1,648,230  
ANTIGLARE ATTACHMENT FOR MOTOR VEHICLES  
Filed May 14 1926  
2 Sheets-Sheet 2
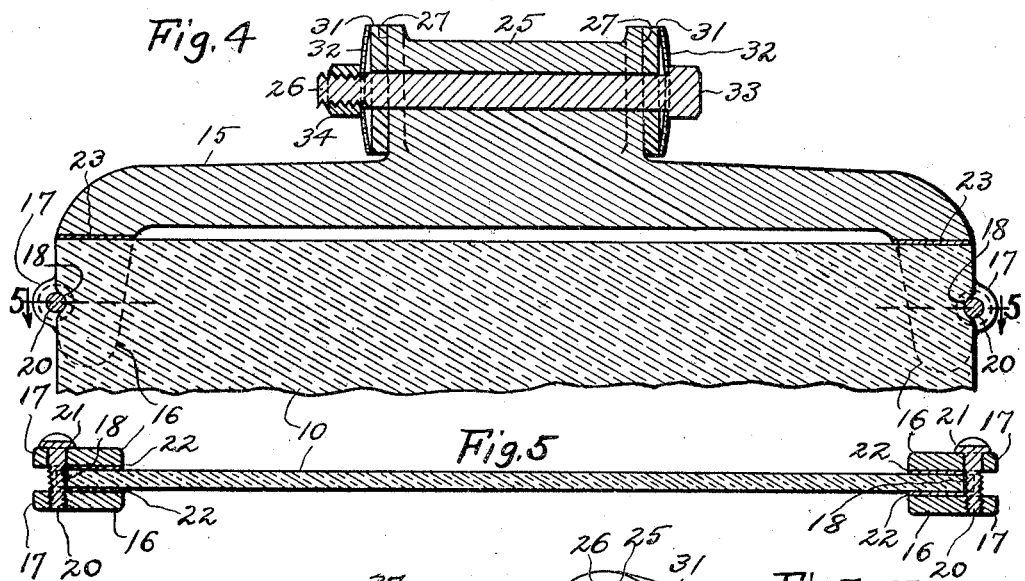
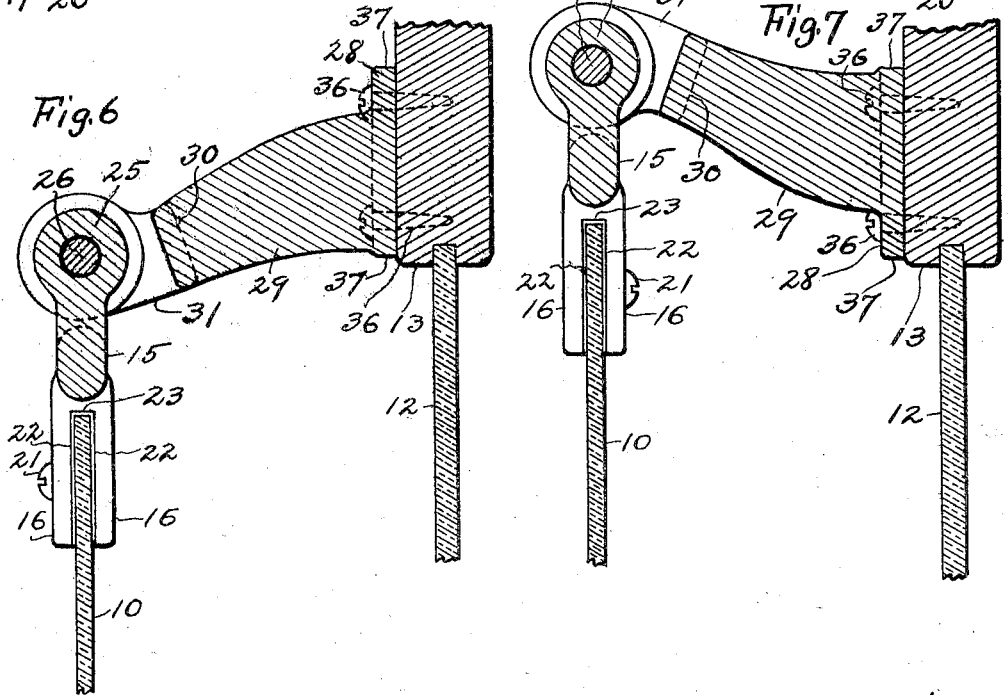
Inventor:
John Edward Herman
By 
his Attorney.

Patented Nov. 8, 1927.

1,648,230

UNITED STATES PATENT OFFICE.

JOHN EDWARD HERMAN, OF SANDUSKY, OHIO.

ANTIGLARE ATTACHMENT FOR MOTOR VEHICLES.

Application filed May 14, 1926. Serial No. 109,082.

This invention relates to improvements in antiglare attachments for motor-vehicles, and pertains more especially to an attachment of the character indicated comprising an antiglare shield which comprises a bar arranged adjacent and longitudinally of the top edge of and supporting an antiglare light-transmitting panel adapted to be arranged opposite and to face the inner side of the wind-shield of a motor-vehicle and also comprises a bracket supporting said bar and adapted to be attached to a supporting member on the vehicle, and said bar is pivoted longitudinally thereof to said bracket so as to cause the antiglare shield to be pivotally connected to said bracket and arranged to be swung laterally.

One object of my invention is to reliably, inexpensively and conveniently attach the antiglare panel to said bar at the side edges of said panel without mutilation of or injury to the panel.

Another object is to attach said antiglare panel, at each end of said bar, to a pair of jaws which are formed on said bar and arranged at the adjacent side edge of the panel and at opposite sides respectively of and in close relation to and face the panel and which are connected together by a securing device extending endwise of and through a recess formed in said panel at said side edge of the panel, so that said panel is held against dropping from between the jaws were the jaws loose in relation to the panel.

Another object is to prevent pressure on the top edge of said panel by said bar between the pair of jaws on one end of the bar and the pair of jaws on the other end of the bar, and to prevent mutilation of said edge of the panel.

The hereinbefore mentioned bracket is reversible top for bottom and comprises a substantially vertical plate or member spaced laterally outwardly from the hereinbefore mentioned bar and adapted to abut laterally against and attachable to the hereinbefore mentioned supporting member on the vehicle and having a top edge and a bottom edge, with one of said edges spaced farther than the other of said edges from the axis of said bar, so that the antiglare panel is lower or higher in relation to said plate or member of the bracket according as the one or the other of said edges is the bottom edge of said member of the bracket, and so as to render my improved antiglare attachment not only suitable for use by drivers of average height and by drivers somewhat above or below the average height but also by abnormally tall drivers.

Another object is to render my improved antiglare attachment simple and durable in construction, and convenient and attractive. With these objects in view, and to attain other objects hereinafter appearing, this invention consists in certain meritorious features of construction, and combinations and relative arrangement of parts, hereinafter described in this specification, pointed out in the claims, and illustrated in the accompanying drawings.

In said drawings, Figure 1 is a right-hand side elevation, partly in section, of an antiglare attachment embodying my invention and shows said attachment secured to the top bar or member of the frame of the windshield of a motor-vehicle, and said windshield is shown in section. Fig. 2 is a top plan and horizontal section along the line 2—2 in Fig. 1. Fig. 3 is a vertical section taken along the line 3—3 in Fig. 1, looking outwardly. Fig. 4 is a vertical section taken along the line 4—4 in Fig. 1, looking inwardly. Fig. 5 is a horizontal section taken along the line 5—5 in Fig. 4, looking downwardly. Fig. 6 is a central vertical section taken along the line 6—6 in Fig. 2. Fig. 7 is a vertical section corresponding with Fig. 6, except that in Fig. 7 the hereinbefore mentioned bracket is in position for abnormally tall drivers, whereas Fig. 6 shows said bracket in position for drivers of average height. Portions are broken away in the drawings to reduce the size of the drawings.

Referring to said drawings, 10 indicates the antiglare light-transmitting glass plate or panel of an antiglare shield constituting an important portion of the antiglare attachment embodying my invention, and in Fig. 1 said panel is shown arranged laterally opposite and facing the inner side of the light-transmitting glass panel 12 of the windshield of a closed car or motor-vehicle and supported, as will hereinafter appear, from the top bar or member 13 of the frame of said wind-shield. The panel 10 is preferably composed of a plate of smoked glass, or of glass having a suitable color such, for instance, as an amber color or a light green color, having a dimming effect on objectionably glaring headlights of an approaching vehicle. The application of an antiglare light-transmitting panel 10 in proper relation to the light-transmitting panel 12 of the wind-shield of a motor-vehicle is too well known to require further explanation in this specification. Suffice it to state that the panel 10 is of suitable dimensions and suitably arranged in relation to the wind-shield.

The antiglare shield of my improved antiglare attachment (see Figs. 1, 2 and 4) also comprises a substantially horizontal metal bar 15 arranged adjacent and preferably opposite and extending longitudinally of the top edge of the panel 10 supported from said bar, and preferably said bar is provided at each end thereof, (see also Fig. 5) with a pair of laterally opposite downwardly projecting jaws 16 which are arranged at opposite sides respectively of the upper portion of and in close relation to and face said panel. The two pairs of jaws 16 are arranged, therefore, adjacent opposite ends respectively of the top edge of the panel 10, and preferably each jaw of each pair of jaws 16 has a portion 17 which extends outwardly from the adjacent side edge of said panel in the direction in which said side edge faces.

The upper portion of the panel 10 (see Figs. 4 and 5) is provided, at each side edge of the panel, with a recess 18 which is spaced from the top edge of the panel and formed between the jaws of the adjacent pair of jaws 16 and extends substantially horizontally from side to side of the panel, and a securing device connects said jaws together and preferably consists of a screw the shank 20 of which engages said recess and extends endwise of and through said recess and beyond the ends of the recess, and said shank of said screw is threaded into one jaw of said pair of jaws, as shown in Fig. 5, and extends loosely through the other jaw of said pair of jaws, and said screw has a head 21 arranged opposite and overlapping the outer side of the last-mentioned jaw of said pair of jaws.

Packing 22 (see Fig. 5) is interposed between the panel-facing portion of each jaw 16 and the adjacent side of the panel 10, and each end portion of the top edge of said panel (see Fig. 4) is covered by packing 23 which extends between the upper ends of the jaws 16 adjacent said portion of said edge of said panel and is interposed between said edge of said panel and the bar 15. By proper manipulation of the screw associated with a pair of jaws 16 the packing 22 interposed between the panel 10 and said jaws may be tightened in relation to said panel as required to bring said jaws into adequately close relation to the panel and to prevent displacement of the panel between said jaws without liability of cracking or otherwise mutilating or injuring said panel, and it will be observed that said panel, were the screw extending through the portions 17 of said jaws inadvertently not manipulated to establish sufficiently close relation between the panel and said jaws, would still be adequately held against dropping from between the jaws by the cooperation of said screw with the wall of the recess 18 engaged by said screw.

The hereinbefore mentioned bar 15 (see Fig. 4) is in spaced relationship to the top edge of the panel 10 from the pair of jaws at one end of the bar to the pair of jaws at the other end of the bar so that the driver of a motor-vehicle provided with my improved antiglare attachment can, if desired, look between said edge and said bar, and so as to prevent any downward pressure on or mutilation of said edge by said bar between the pairs of jaws 16 of the bar. The packing 23 between the bar 15 and each end portion of the top edge of the panel 10 serves to prevent mutilation of said portion of said edge of the panel, and I would here remark that an antiglare shield comprising a bar 15 arranged, as hereinbefore described, in relation to said panel and terminating at each end in a pair of jaws 16 applied in relation to the panel and contoured as hereinbefore described, is simple and durable in construction and attractive.

The bar 15 (see Figs. 2, 4 and 6) has an upward enlargement 25 preferably formed at the top and extending longitudinally of the bar, and said enlargement is preferably in the form of a substantially horizontal tubular member which extends longitudinally of said bar and has bearing on and is supported from a substantially horizontal pivotal pin 26 extending through and longitudinally and beyond the ends of said tubular member or enlargement of said bar. The enlargement 25 of the bar 15 has two substantially vertical and parallel end faces 27 formed at opposite ends respectively thereof.

The pivotal pin 26 is supported from a bracket which preferably comprises a substantially vertically arranged plate 28 shown positioned laterally opposite and abutting against the inner side of and secured to the top bar or member 13 of the frame of the wind-shield, and in Figs. 1 and 6 the panel 10 is shown arranged below the supporting member 13 and spaced downwardly as well as inwardly from said supporting member.

The plate 28 (see Figs. 1, 2, 3 and 6) has an arm 29 arranged centrally between the side edges of the plate and extending from said plate in the direction of the upward enlargement 25 of the bar 15 and terminating centrally of and in the central portion 30 of a U-shaped member the end portions 31 of which extend opposite and abut against and cover opposite end faces 27 respectively of said enlargement 25, and said U-shaped member of the bracket is arranged with its central portion 30 laterally opposite the outer side of said enlargement. The pivotal pin 26 extends through and has bearing in the end portions 31 of said U-shaped member and also extends a suitable distance beyond the outer side of said portions of said U-shaped member.

At the outer side of each end portion 31 of said U-shaped member (see Figs. 1, 2 and 4) is arranged a concavo-convex spring metal washer 32 mounted on the pin 26 and disposed with its concave side facing said side of said portion of said U-shaped member. The washer 32 at the outer side of one end portion of said U-shaped member is interposed between the outer side of said portion of said U-shaped member and a head 33 on the pin 26, and a nut 34 is threaded onto said pin at the outer side of the other end portion of said U-shaped member. Obviously the required manipulation of said nut will result in placing the washers 32 under the tension required to establish such frictional engagement of the end portions 31 of said U-shaped member with the end faces 27 of the enlargement 25 of the bar 15 as to hold the bar 15 and connected panel 10 in any desired position without interfering with the swinging of said panel laterally inwardly and upwardly out of the way when desired.

The plate 28 of the hereinbefore mentioned bracket (see Figs. 1, 2 and 3) has two vertically spaced pairs of horizontally spaced holes 35 which extend laterally through the plate and are employed in receiving securing devices such, for instance, as screws 36, employed in attaching the bracket to the supporting member 13 on a motor-vehicle.

The plate 28 preferably has horizontal top and bottom edges 37 to facilitate accurate positioning of the bracket in relation to said supporting member, and it will be observed that one of said edges is farther than the other of said edges from the axis of the bar 15 so that the antiglare panel 10 is lower or higher according as the bracket is in position with the one or the other of said edges as the bottom edge of the plate. It will be observed therefore that said bracket is reversible top for bottom, that the U-shaped member of the bracket constitutes the lowermost portion of the bracket when the bracket is positioned as shown in Figs. 1 and 6 in relation to the supporting member 13, that said U-shaped member constitutes the uppermost portion of the bracket when the bracket is arranged as shown in Fig. 7 in relation to said supporting member, and that the bracket, when it is in the position shown in Fig. 6, is suitable for use by drivers of average height or by drivers somewhat above or below the average height, whereas the bracket, when it is in the position shown in Fig. 7, is more especially suitable for abnormally tall drivers.

What I claim is:

1. An antiglare attachment for a motor-vehicle, comprising an antiglare light-transmitting panel adapted to be arranged opposite and to face the inner side of the windshield of the vehicle and provided at each side edge of the upper end portion of the panel with a recess which is spaced from the top edge of the panel and extends substantially horizontally from side to side of the panel, a metal bar arranged adjacent and extending longitudinally of the top edge of said panel and provided at each end thereof with a pair of laterally opposite jaws which are arranged at opposite sides respectively of the upper portion of and in close relation to and face the panel, means for supporting said bar from a supporting member on the vehicle, each of the aforesaid jaws having an enlargement which is arranged opposite the adjacent end of the adjacent recess in said panel and extends from a point above to a point below said recess and outwardly from the adjacent side edge of the panel in the direction in which said side edge faces, and a securing device engaging said recess and extending endwise of and beyond the ends of the recess and connecting together the jaws adjacent the recess.

2. An antiglare attachment for a motor-vehicle, comprising an antiglare light-transmitting panel adapted to be arranged opposite and to face the inner side of the windshield of the vehicle and provided at each side edge of the upper end portion of the panel with a recess which is spaced from the top edge and extends substantially horizontally from side to side of the panel, a bar arranged adjacent and extending longitudinally of the top edge of said panel and provided at each end thereof with a pair of laterally opposite jaws which are arranged at opposite sides respectively of the upper portion of and in close relation to and face the panel and respectively extend opposite the adjacent end of the adjacent recess in said panel and outwardly from the adjacent side edge of the panel in the direction in which said side edge faces, a screw extending endwise of and through said recess and beyond the ends of the recess and threaded into one jaw of the pair of jaws adjacent said recess and extending loosely through the other jaw of said pair and having a head arranged opposite and overlapping the outer side of the last-mentioned jaw, and means for supporting the aforesaid bar from a supporting member on the vehicle.

3. An antiglare attachment for a motor-vehicle, comprising an antiglare light-transmitting panel adapted to be arranged opposite and to face the inner side of the windshield of the vehicle, a bar arranged adjacent and extending longitudinally of the top edge of and supporting said panel and having an enlargement extending longitudinally of the bar, a pivotal pin which has bearing in said bracket and extends endwise of said enlargement of and supports said bar, a bracket supporting said pin and comprising a substantially vertically arranged plate which is spaced laterally outwardly from said enlargement of the bar and has a top edge and a bottom edge and also has two vertically spaced pairs of horizontally spaced holes which extend laterally through the plate and are adapted to receive securing devices for attaching the plate to a supporting member on the vehicle, one of said edges of said plate being farther than the other of said edges from the axis of the bar.

In testimony whereof, I sign the foregoing specification.

JOHN EDWARD HERMAN.